United States Patent [19]

Crass et al.

[11] Patent Number: 4,720,420

[45] Date of Patent: Jan. 19, 1988

[54] SEALABLE, TRANSPARENT POLYOLEFINIC MULTILAYER FILM

[75] Inventors: Günther Crass, Taunusstein; Lothar Bothe, Mainz-Gonsenheim; Siegfried Janocha, Wiesbaden, all of Fed. Rep. of Germany

[73] Assignee: Hoechst Aktiengesellschaft, Frankfurt am Main, Fed. Rep. of Germany

[21] Appl. No.: 801,808

[22] Filed: Nov. 26, 1985

[30] Foreign Application Priority Data

Dec. 4, 1984 [DE] Fed. Rep. of Germany .. 34441581

[51] Int. Cl.$^4$ .................. B32B 7/02; B32B 27/08; C09J 7/02
[52] U.S. Cl. .................. 428/216; 156/229; 156/244.24; 428/220; 428/331; 428/349; 428/354; 428/447; 428/451; 428/516
[58] Field of Search ............ 428/500, 347, 516, 447, 428/349, 354, 220, 216, 331, 451; 156/229, 244.24

[56] References Cited

U.S. PATENT DOCUMENTS

| | | | |
|---|---|---|---|
| 4,230,767 | 10/1980 | Isaka et al. | 428/349 |
| 4,293,608 | 10/1981 | Isaka et al. | 428/220 |
| 4,297,415 | 10/1981 | Ward et al. | 428/500 X |
| 4,348,457 | 9/1982 | Rosenthal et al. | 428/349 |
| 4,502,263 | 3/1985 | Crass et al. | 428/347 X |
| 4,595,625 | 6/1986 | Crass et al. | 428/215 |

*Primary Examiner*—Thomas J. Herbert
*Attorney, Agent, or Firm*—Schwartz, Jeffery, Schwaab, Mack, Blumenthal & Evans

[57] ABSTRACT

A sealable, transparent polyolefinic multilayer film composed of a polypropylene base layer, a non-sealable surface layer, and a sealable surface layer, and process therefor. The sealable surface layer has a low minimum sealing temperature and is made from a copolymer of propylene and ethylene or butene-1 units and/or a terpolymer of ethylene, propylene and butene-1 units. The non-sealable layer is a combination of a propylene homopolymer, a slip agent, and an anti-blocking agent. The process includes coextruding the three layers, biaxially stretching the coextruded film, and subjecting the non-sealable layer to a corona-discharge treatment.

18 Claims, No Drawings

SEALABLE, TRANSPARENT POLYOLEFINIC MULTILAYER FILM

BACKGROUND OF THE INVENTION

The present invention relates to a sealable, transparent multilayer film which is composed of a base or support layer comprising a propylene polymer and a sealable surface layer having a low minimum sealing temperature.

Films of this kind are used as packaging films in horizontal forming, filling and sealing machines. In the packaging process, the film which enters into the machine as a flat web is bent about its longitudinal axis so as to wrap the product to be packaged and is shaped into a tubular casing. The sealable surface layer forms the inside of the tubing. The edge zones of the film are placed one on top of the other in such a way that inside is in contact with inside. By the application of heat, a strip-shaped sealed seam (fin seal) is then produced, which projects from the tubular package and extends parallel to the longitudinal axis of the tubing. For portioning the product which has been filled in the forming individual packages, sealed seams are produced which extend, in mutually spaced arrangement, transversely to the longitudinal axis of the tubing and the tubular casing is severed in the region of these transverse seams transversely to the longitudinal axis of the casing.

It has been found that customary polypropylene-based films are hardly suitable for this application. Especially in modern, high-speed forming, filling and sealing machines, in which the film is conveyed in the horizontal direction at a speed exceeding 40 m/min, machine runability and slip properties of the film must be particularly good.

U.S. Pat. No. 4,297,415 has disclosed a sealable, transparent polyolefinic multilayer film which is intended for use as a packaging film in high-speed forming, filling and sealing machines. The film is composed of a base layer comprising a propylene polymer and two sealable surface layers comprising copolymers of ethylene with propylene or of ethylene with butene-1. If this film is to be corona-treated to improve printability it must, however, comprise further additions of slip agents, which will adversely influence its optical properties, such as gloss and degree of turbidity.

The sealable, transparent polyolefinic multilayer film according to U.S. Pat. No. 4,502,263 is formed of a base layer comprising a propylene polymer and at least one sealable layer comprising a polyolefin resin, a low molecular-weight resin which is compatible with the polyolefin resin, a propylene homopolymer and a polydiorganosiloxane. It is also intended for use as a packaging film in horizontal forming, filling and sealing machines and actually shows good processing characteristics in high-speed packaging machines. Although this multilayer film meets the technical requirements demanded of a packaging film for use in a packaging machine, handling of the film gives rise to problems, since it has a relatively smooth surface. For example, when these films which are present on 4 to 6 m wide original rolls, are cut to smaller widths, an increased oscillation results. Due to this lateral variation in the rewound film of reduced width, the new roll does not have the exact width, corresponding to the width of the cut film web. In addition, there is a strong tendency in the wound up film that film layers lying one on top of the other slip laterally from the roll, parallel to the longitudinal axis of the roll, a phenomenon which is known as "telescoping." As a result of telescoping, the edges of the film are no longer exactly superposed in the roll, but are, to a slight distance, laterally displaced with respect to each other. Owing to these difficulties, the machine speed must be drastically reduced in the cutting and winding process, which considerably increases the cost of film conversion. To obviate this difficulty, a silicate having the shape of platelets is added to the sealable surface layer, according to German Offenlegungsschrift No. 3,331,983.

It has been found, however, that these films can only be used in applications, in which they should be absolutely transparent to provide an unobstructed view of their contents. However, it is frequently required to apply a printing to the packaging film. In these cases, the film must be subjected to a corona-discharge treatment to render it printable. By this treatment, the surface tension of the film is increased and adhesion between film surface and printing ink is thus improved. This pretreatment has, however, the great disadvantage that the films so treated lose their good running characteristics in high-speed packaging machines.

SUMMARY OF THE INVENTION

It is accordingly an object of the present invention to provide a sealable, transparent polyolefinic multilayer film which is converted without difficulties and without any risk of telescoping upon winding up.

It is another object of the invention to provide a multilayer film, as above, which shows good processing characteristics in high-speed packaging machines, especially in horizontal forming, filling and scaling machines.

It is yet another object of the invention to provide a multilayer film, as above, which has good optical properties and a high scratch resistance and, in particular, ensures a perfect printability.

Still another object of the invention is to provide a process for producing the above-described film.

These objects are achieved by a sealable, transparent polyolefinic multilayer film, comprising a polypropylene base layer, a sealable surface layer selected from the group consisting of a copolymer of propylene and ethylene, a copolymer of propylene and butene-1, a terpolymer of ethylene, propylene and butene-1, and combinations of the above, and a non-sealable surface layer comprising from about 96.5% to about 99.6% by weight of a propylene homopolymer, from about 0.3% to about 2.5% by weight of a slip agent, and from about 0.1% to about 1.0% by weight of an anti-blocking agent.

The objects of the invention are further achieved by a process for preparing the above-described multilayer film, which comprises the steps of coextruding a base layer and a separate surface layer on each side of the base layer to form the multilayer film, one of the surface layers being sealable and the other being non-sealable; biaxially stretching the multilayer film in longitudinal and transverse directions; and subjecting the non-sealable surface layer to a corona-discharge treatment.

DETAILED DESCRIPTION OF THE PREFERRED EMBODIMENTS

Contrary to the multilayer films of the prior art, the multilayer film of the present invention has only one sealable surface layer, while the other surface layer comprises the same polymer forming the base layer. When this non-sealable surface layer is corona-treated, the adverse changes of the film observed in the corona-treatment of sealable surface layers surprisingly do not occur.

It has moreover unexpectedly been found, that a film of only two layers comprising a base layer and a single sealable surface layer does not yield the result which is intended to be achieved by the present invention, when the non-sealable film surface, i.e., the base layer in this specific case, is corona-treated in analogy with the present invention and the base layer contains the same additives as the non-sealable surface layer according to the present invention. With respect to machine runability as well as optical properties and scratch resistance, this film is clearly inferior to the three-layer film of the present invention.

The propylene polymer forming the base layer of the multilayer film comprises a polymer which is customarily used for this purpose, for example, a homopolymer, particularly an isotactic polypropylene comprising a proportion which is soluble in n-heptane of maximally 15% by weight or a copolymer of propylene with ethylene or $C_4$ to $C_8$ α-olefins, comprising a propylene proportion of at least 90% by weight. The propylene polymer of the base layer appropriately has a melt flow index ranging from about 0.5 to about 8 g/10 min, particularly from about 1.5 to about 4 g/10 min at 230° C. and under a load of 21.18N (DIN 53 735) and a melting point of at least about 140° C., preferably of about 150° C. or higher. The non-sealable surface layer also comprises the propylene homopolymer forming the base layer. Moreover, the sealable surface layer may contain propylene homopolymer as an additive. In addition to the propylene polymer, the base layer may contain an antistatic agent. Particularly suitable antistatic agents include long-chain, aliphatic tertiary amines, in which the aliphatic radical has a carbon chain length from $C_{12}$ to $C_{18}$ and which are substituted by two hydroxyalkyl-($C_1$ to $C_4$) groups. These antistatic agents are, for example, described in U.S. Pat. No. 4,230,767. An addition ranging from about 0.1 to about 0.4% by weight is sufficient. N,N-bis-(2-hydroxyethyl)-($C_{12}$ to $C_{18}$)-alkyl amines are particularly preferred. Further additives, such as slip agents and anti-blocking agents, which are included in the base layer to improve the slip properties, do not yield practically any additional effect, as far as the machine runability of the multilayer film is concerned.

As the multilayer film is to be used in forming, filling and sealing machines, the minimum sealing temperature should be relatively low and should not exceed about 100° C. The minimum sealing temperature is the sealing temperature, at which the strength of the sealed seam attains a value of about 0.5N per 15 mm strip width.

A polyolefin resin which is suitable for use in a sealable surface layer of this kind comprises a copolymer of propylene and ethylene units or of propylene and butene-1 units. Suitable copolymers formed of ethylene and propylene units contain from about 3 to about 10% by weight of ethylene units, copolymers of propylene and butene-1 units contain from about 5 to about 40% by weight of butene-1 units. Polyolefin resins which are additionally suitable for use in the sealable surface layer comprises terpolymers of ethylene, propylene, and butene-1 units containing a proportion of at least about 80% by weight of propylene units. The sealable surface layer has a melting point of at least about 130° C., and the melt flow index of the polyolefin resin of the sealable surface layer is in the range from about 1 to about 16 g/10 min at 230° C. and under a load of 21.18N (DIN 53 735).

Mixtures of the indicated copolymers and terpolymers, especially a mixture of a $C_3/C_4$-copolymer and a $C_2/C_3/C_4$-terpolymer are particularly advantageously employed, as has already been described in U.S. Pat. No. 4,502,263. Particularly when using this specific polymer mixture for the sealable surface layer, it has unexpectedly been found that customary additions of slip agents (polydiorganosiloxane) and/or anti-blocking agents (silicates) are no longer required in the sealable layer.

A preferred sealable surface layer comprises an ethylene-propylene-butene-1 terpolymer and a propylene-butene-1 copolymer, corresponding to a content of from about 0.1% to about 7% by weight of ethylene, from about 53% to about 89.9% by weight of propylene, and from about 10 to about 40% by weight of butene-1, based on the total weight of the olefin resin composition.

To improve the optical properties and reduce the sensitivity to scratching of the multilayer film, from about 5 to about 15% by weight, based on the sealable surface layer, of a low molecular-weight thermoplastic resin which is compatible with the sealable polyolefin resin and has a softening point in the range of from about 60° to about 180° C., particularly from about 80° to about 130° C. (DIN 1995-U4), is appropriately used in the sealable surface layer, as is known per se. Compatible resins are to be understood as including resins which, in the indicated concentration, do not cause any turbidity of the multilayer film. Examples of these resins comprise hydrocarbon resins, ketonic resins, polyamide resins, colophony, dammar resins and chlorinated aliphatic and aromatic hydrocarbon resins. The addition of these resins to a polyolefinic sealable surface layer is described in U.S. Pat. No. 4,502,263.

As is also known per se (cf. U.S. Pat. No. 4,502,263), it is further possible to improve optical properties, scratch resistance and also machine runability by adding from about 5 to about 15% by weight of a propylene homopolymer to the sealable surface layer. Suitable propylene homopolymers are identical to those described above for use in the base layer. The melting point of the polypropylene is above the melting point of the polyolefin resin of the sealable surface layer.

According to the present invention it is essential that a second, non-sealable surface layer is present and that—contrary to the sealable layer and the base layer—this layer contains a slip agent and an anti-blocking agent. It has surprisingly been found that the machine runability as well as the optical effect of the multilayer film are clearly improved, when the slip agent and the anti-blocking agent are not contained in the sealable layer, but are exclusively present in the non-sealable layer.

For the most part, the non-sealable surface layer comprises a propylene homopolymer and it preferably contains small amounts of a polydiorganosiloxane as a slip agent and of pigments as an anti-blocking agent. While it is true that incompatible resins, for example, as used in U.S. Pat. No. 4,348,457 as anti-blocking agents or fatty acid amides used as slip agents, may have a similar effect as far as machine runability is concerned, polydiorganosiloxanes and pigments are, however, preferred since they do not adversely influence the optical properties of the film.

Particularly suitable propylene homopolymers have been discussed above, when describing the base layer. For reasons of coextrusion technique it is, however, appropriate for the polypropylene of the non-sealable surface layer to have a melt flow index which is higher than the melt flow index of the polypropylene of the base layer.

The polydiorganosiloxane is used in a quantity from 0.3 to 2.5% by weight, based on the non-sealable surface layer, and preferably comprises a polymethylphenylsiloxane or a polydimethylsiloxane, which particularly has a kinematic viscosity in the range from about $10^3$ to about $10^6$, especially from about 20,000 to about 30,000 $mm^2/s$ at 25° C.

The non-sealable surface layer further contains from about 0.1 to about 1% by weight of an inorganic pigment, preferably a silicate which has a platelet structure and aligns mainly in parallel with the plane of the film, when the film is biaxially oriented. Platelet-shaped silicates having an average particle diameter from about 0.1 to about 3.0 $\mu$m are particularly advantageous. Highly preferred are particle diameters of from about 0.2 to about 1.5 $\mu$m. These specific silicates have the advantage that they do not increase the sensitivity to scratching of the film, while simultaneously improving the slip behavior of the film.

The surface layers should have a thickness of less than about 3 $\mu$m, particularly less than about 1.5 $\mu$m, since greater layer thicknesses would impair the processing behavior of the film in high-speed packaging machines. The biaxially stretched multilayer film preferably has a total thickness of from about 10 to about 50 $\mu$m, in particular from about 15 to about 35 $\mu$m.

To prepare the molding compounds used for the surface layers and join the molding compounds to the base layer, customary methods are employed, for example, laminating or melt-extruding. In the coextrusion process, the known stretching conditions used in the manufacture of sealable, transparent polyolefinic multilayer films are observed. Following the customary stretching in the longitudinal and transverse directions, the non-sealable surface layer is subjected to a corona-discharge treatment at the usual intensity. In the process, voltage and amperage are adjusted to the values required to obtain a surface tension of from about 36 to about 40 mN/m in a comparable film without the addition of a slip agent (polysiloxane addition). Direct measurement of the surface tension of the film through its wettability by test liquids (DIN 53 364) is impossible in the presence of a polysiloxane.

The corona-treated non-sealable surface layer readily accepts printing ink. Suitable printing inks include one-component as well as two-component printing inks, which adhere excellently to this surface.

The invention is explained in detail by the following example. The measured values were determined according to the following measuring methods:

Melt flow index: DIN 53 735 at 230° C. and under a load of 21.18N

Softening point: DIN 1935-U4 (Vicat-A)

Melting point: DSC measurement, maximum of melting curve, rate of heating 20° C./min

EXAMPLE

With the aid of the coextrusion process, a 1 mm thick multilayer film which was formed of a base layer comprising a propylene homopolymer having a melt flow index of 2 g/10 min and two different outer layers was extruded through a slot die having a width of 280 mm and a gap height of 1.8 mm, at an extrusion temperature of 260° C. and a throughput of 70 kg/h. After travelling through an air gap having a length of 20 mm this film was chilled on a chill roll at a temperature of 30° C., which had a diameter of 600 mm and rotated at a circumferential speed of 4.5 m/min. Thereafter, the film was passed from the chill roll to a three-high roll arrangement which also had a temperature of 30° C. and rotated at a circumferential speed of 4.5 m/min and after heating to 130° C., the film was longitudinally stretched by a factor of 5 by a further three-high roll arrangement. The film was then stretched 10 times in the transverse direction at an air temperature of 175° C.

The multilayer film thus formed was composed of an approximately 19 $\mu$m thick base layer of polypropylene and a 0.5 to 0.8 $\mu$m thick covering layer arranged on either side thereof. The non-sealable surface layer was rendered printable by means of a corona discharge treatment.

The sealable surface layer comprised:

(a) 80% by weight, based on the sealing layer, of an olefin resin composition comprising:
- ($a_1$) 50% by weight of an ethylene-propylene-butylene terpolymer comprising 1.4% by weight of ethylene, 2.8% by weight of butylene and 95.8% by weight of propylene (in each case based on the terpolymer), and
- ($a_2$) 50% by weight of a propylene-butylene copolymer comprising 66.8% by weight of propylene and 33.2% by weight of butylene (in each case based on the copolymer), corresponding to a content of 0.7% by weight of ethylene, 81.3% by weight of propylene and 18% by weight of butylene. The olefin composition $a_1 + a_2$ had a melt flow index of 8 g/10 min and a melting point of 150° C.;

(b) 10% by weight, based on the sealing layer, of Arkon ® P 125 (a hydrogenated hydrocarbon resin having a softening point of 125° C.), as the resin which is compatible with the olefin resin composition;

(c) 10% by weight, based on the sealing layer, of a propylene homopolymer having a melting point of 162° C. (Hostalen ® PPN 1060 F).

The non-sealable surface layer comprised:

(a) 98.8% by weight of an isotactic propylene homopolymer ($i_{21.18} = 3.5$ g/10 min) having a melting point of 162° C., (b) 0.4% by weight of a platelet-shaped aluminum silicate, average particle size 0.55 $\mu$m, (c) 0.8% by weight of polydimethylsiloxane, kinematic viscosity 25,000 $mm^2/s$ (25° C.).

The following table gives an evaluation of the multilayer film when used for its intended purpose in a horizontally operating forming, filling and sealing machine, compared with the multilayer film disclosed in U.S. Pat. No. 4,502,263.

Processing tests were carried out in a horizontally operating forming, filling and sealing machine.

| | Packaging Speed | | |
|---|---|---|---|
| | 10 m/min | 20 m/min | 40 m/min |
| Comparative Example 1 acc. to U.S. Pat. No. 4,502,263 (unsuited for printing) | + | + | + |

-continued

| | Packaging Speed | | |
|---|---|---|---|
| | 10 m/min | 20 m/min | 40 m/min |
| Comparative Example 2 acc. to U.S. Pat. No. 4,502,263 (corona-treated, printable) | + | − | − |
| Example acc. to the present invention | + | + | + |

Classification of machine runability:
+ absolutely trouble-free operation of machine
− more than 3 interruption/10 min
− continuous passage of film impossible The foregoing description of preferred embodiments has been set forth merely to illustrate the invention and is not intended to be limiting. Since modifications of the described embodiments incorporating the spirit and substance of the invention may occur to persons skilled in the art, the scope of the invention should be limited solely with respect to the appended claims and equivalents.

What is claimed is:

1. A sealable, transparent polyolefinic multilayer film, comprising:
   a polypropylene base layer;
   a sealable surface layer disposed on one surface of said base layer and comprising an ethylene-propylene-butene-1 terpolymer and a propylene-butene-1 copolymer, corresponding to a content of from about 0.1% to about 7% by weight of ethylene, from about 53% to about 89.9% by weight of propylene and from about 10 to about 40% by weight of butene-1, based on the total weight of the olefin resin composition; and
   a non-sealable surface layer disposed on the other surface of said base layer and comprising from about 96.5% to about 99.6% by weight of a propylene homopolymer, from about 0.3% to about 2.5% by weight of a slip agent, and from about 0.1% to about 1.0% by weight of an anti-blocking agent.

2. A packaging film produced from the multilayer film of claim 1, wherein said surface layers have a thickness of less than about 3 μm.

3. A packaging film as claimed in claim 2, wherein said multilayer film is biaxially stretched, and wherein the biaxially structured multilayer film has a total thickness of from about 10 to about 50 μm.

4. A multilayer film as claimed in claim 1, wherein said sealable surface layer further contains at least one additive selected from the group consisting of a low molecular weight resin, said resin being compatible with the copolymer or terpolymer of said sealable surface layer, and a propylene homopolymer, each of said at least one additive present in an amount of from about 5% to about 15% by weight of said sealable surface layer.

5. A multilayer film as claimed in claim 1, wherein said non-sealable surface layer is corona-treated to improve its printability.

6. A multilayer film as claimed in claim 1, wherein said film is oriented by a biaxial stretching process.

7. A multilayer film as claimed in claim 1, wherein said slip agent is a polydiorganosiloxane.

8. A multilayer film as claimed in claim 7, wherein said polydiorganosiloxane is selected from the group consisting of polydialkylsiloxane and polyalkylphenylsiloxane.

9. A multilayer film as claimed in claim 8, wherein said polydiorganosiloxane is selected from the group consisting of a polydimethylsiloxane and a polymethylphenylsiloxane.

10. A multilayer film as claimed in claim 9, wherein said polydiorganosiloxane has a kinematic viscosity of from about $10^3$ to about $10^6$ mm$^2$/s at 25° C.

11. A multilayer film as claimed in claim 9, wherein said polydiorganosiloxane has a kinematic viscosity of from about 20,000 to about 30,000 mm$^2$/s at 25° C.

12. A multilayer film as claimed in claim 1, wherein said anti-blocking agent is an inorganic pigment.

13. A multilayer film as claimed in claim 12, wherein said inorganic pigment is a silicate.

14. A multilayer film as claimed in claim 12, wherein the inorganic pigment contained in said non-sealable surface layer comprises a platelet-shaped silicate having an average particle diameter of from about 0.1 to about 3 μm.

15. A multilayer film as claimed in claim 14, wherein the inorganic pigment has an average particle diameter of from about 0.2 to about 1.5 μm.

16. A process for preparing a sealable, transparent polyolefinic multilayer film, comprising the steps of:
    coextruding a base layer and a separate surface layer on each side of said base layer to form the multilayer film, one of said surface layers being sealable and the other of said surface layers being non-sealable;
    biaxially stretching said multilayer film in longitudinal and transverse directions; and
    subjecting said non-sealable surface layer to a corona-discharge treatment;
    wherein said base layer is a polypropylene, said sealable surface layer comprises an ethylene-propylene-butene-1 terpolymer and a propylene-butene-1 copolymer, corresponding to a content of from about 0.1% to about 7% by weight of ethylene, from about 53% to about 89.9% by weight of propylene and from about 10 to about 40% by weight of butene-1, based on the total weight of the olefin resin composition; and said non-sealable surface layer comprise from about 96.5% to about 99.6% by weight of a propylene homopolymer, from about 0.3% to about 2.5% by weight of a slip agent, and from about 0.1% to about 1.0% by weight of an anti-blocking agent.

17. A process as claimed in claim 16, wherein said corona-discharge treatment is performed at an intensity sufficient to obtain a surface tension equivalent to between about 36 and about 40 mN/m in a comparable surface layer lacking said slip agent.

18. A process as claimed in claim 16, wherein said biaxially stretched film has a thickness of from about 10 μm to about 50 μm.

* * * * *